United States Patent [19]

Klappert et al.

[11] Patent Number: 5,394,182
[45] Date of Patent: Feb. 28, 1995

[54] SYSTEM FOR DELIVERING DIGITAL SOUND, GRAPHICS, REAL TIME FILES AND DATA VIA CABLE

[75] Inventors: Walter R. Klappert, Topanga; Michael L. La Jole, Venice, both of Calif.

[73] Assignee: Time Warner Interactive Group, Inc., Burbank, Calif.

[21] Appl. No.: 34,307

[22] Filed: Mar. 22, 1993

[51] Int. Cl.$^6$ .............................................. H04N 7/10
[52] U.S. Cl. .......................................... 348/10; 348/5; 348/461; 455/3.1
[58] Field of Search ................. 348/8, 10, 5, 12, 13, 348/484, 473, 461, 462, 472, 471; 345/1; 455/3.1, 3.2, 3.3, 4.2, 6.3, 6.2; 358/86; H04N 7/10

[56] References Cited

U.S. PATENT DOCUMENTS

| | | | |
|---|---|---|---|
| 4,547,804 | 10/1985 | Greenberg | 348/473 |
| 4,602,279 | 7/1986 | Freeman | 348/10 |
| 4,787,085 | 11/1988 | Suto | 348/10 |
| 4,835,604 | 5/1989 | Kondo | 348/8 |
| 5,010,499 | 4/1991 | Yee | 348/10 |
| 5,105,268 | 4/1992 | Yamanouchi | 348/10 |
| 5,133,079 | 7/1992 | Ballantyne | 348/10 |
| 5,134,464 | 7/1992 | Basile | 348/487 |

FOREIGN PATENT DOCUMENTS 59-51687  3/1984  Japan .

*Primary Examiner*—James J. Groody
*Assistant Examiner*—Sherrie Hsia
*Attorney, Agent, or Firm*—Blakely, Sokoloff, Taylor & Zafman

[57] ABSTRACT

A method and apparatus for sending digital audio data and/or digital graphics within available bandwidth used to carry television signals into end-user homes and offices, such as, additional bandwidth which will become available as optical fiber replaces cable currently in use to carry cable television programming. The invention also makes it possible for digital audio and graphics, including computer generated data such as output from a word processing, paint or real time file builder program, to be sent over any regular television channel on any cable system. The system could even be used on a television signal broadcast at a normal broadcast frequency if the signal received in the home is of high enough quality. The system utilizes existing cable decoder boxes which have been improved by the addition of a decoder which decodes a composite or RF video signal containing digitized audio to audio, and optional additional signal processing, for playback or recording by existing consumer electronics audio equipment.

13 Claims, 4 Drawing Sheets

SYSTEM FOR DELIVERING DIGITAL SOUND, GRAPHICS, REAL TIME FILES AND DATA VIA CABLE

BACKGROUND OF THE INVENTION

(1) Field of the Invention

The invention is directed to systems for delivering digital data, independent of content, from program source to the end user.

(2) Description of the Related Art

Systems for delivering program material, typically as an analog video signal, to an end user exist in the nature of RF broadcasting, cable delivery and satellite delivery. The invention differs mainly in its ability to distribute digital information using the existing analog distribution systems.

BRIEF SUMMARY OF THE INVENTION

Cable television systems in the United States typically utilize coaxial cable which require the use of signal amplifiers capable of carrying a bandwidth of approximately 300 MHz of information which is sufficient to carry the information for approximately 50 television channels. Efforts are underway to substitute optical fiber to reduce the number of signal amplifiers to achieve a bandwidth of 1 gigahertz for a cable television system. This increased bandwidth is capable of carrying approximately 150 television channels. However, since it is highly unlikely that any community would have the need for 150 separate channels, it would be advantageous to use, for example, only half of the available bandwidth for television channels, which would still allow for 75 channels, and use the remaining ½ gigahertz of bandwidth for digital data.

In this connection, the invention is directed to a method and apparatus for sending digital audio data and/or digital graphics within the aforesaid ½ gigahertz of available bandwidth, specifically, the upper ½ gigahertz of available bandwidth. It should be noted however that the invention is not limited to the use of the upper ½ gigahertz of available bandwidth, but makes it possible for digital audio and graphics to be sent over any regular television channel on any cable system. The system could even be used on a television signal broadcast at a normal broadcast frequency if the signal received in the home is of high enough quality.

DETAILED DESCRIPTION OF THE INVENTION

Figure 1:
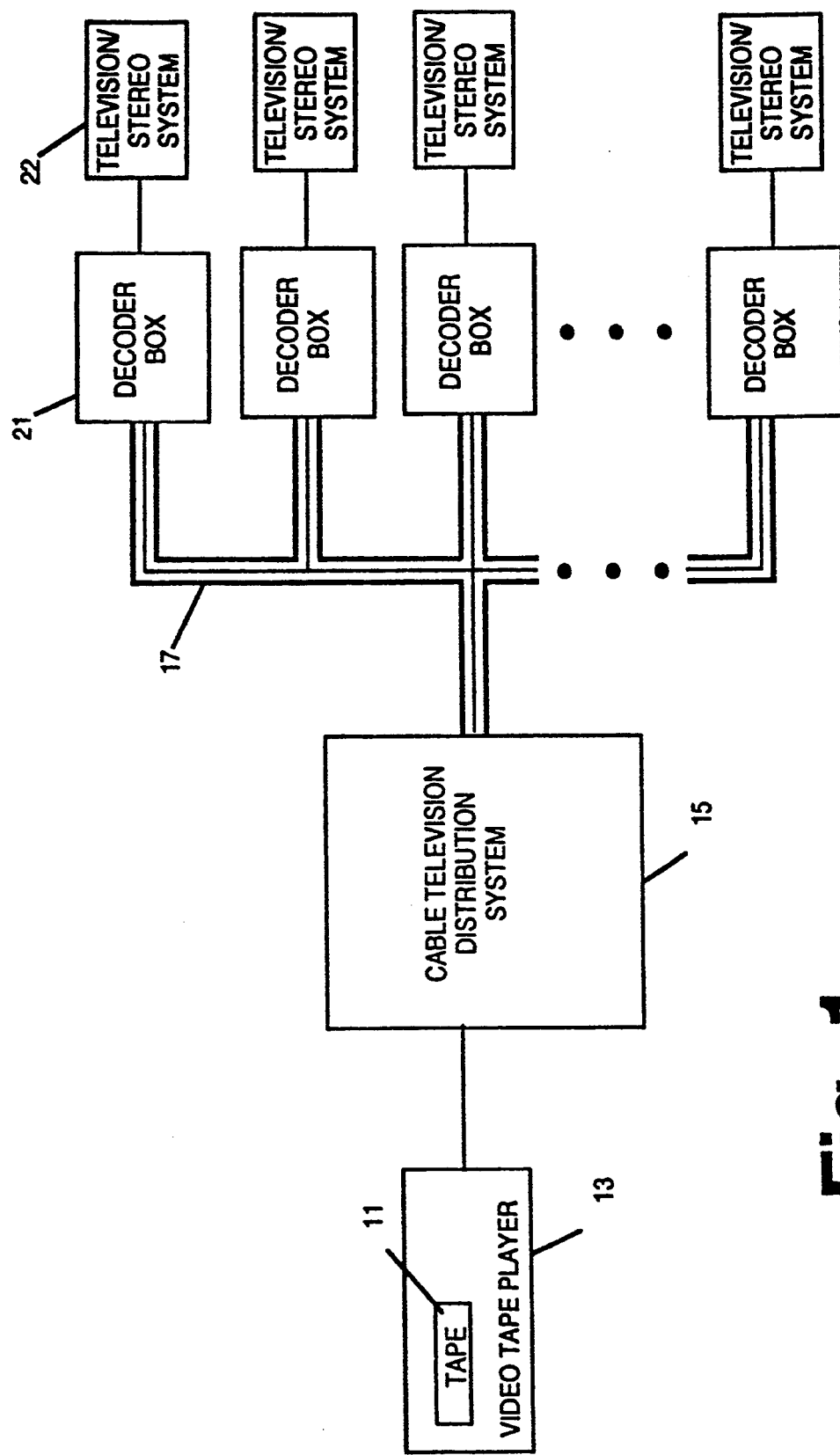
FIG. 1 is a block overview diagram of the invented system.

Referring to FIG. 1, a video tape 11 is created such that encoded in the video signal is the digital audio, graphics or data information which is to be sent over the cable or optical fiber to a cable subscribers' homes. One suitable video tape which may be used to practice the invention is ¾" video tape which is commonly used as the medium for storing digital data on a master tape used to press a compact disc. Bits of digital data are represented by dark and light areas in the video "picture." The industry standard tape for ¾" tape for compact disc masters is called PCM 1630. However, a standard for digital audio also exists for less expensive ½" video tapes in formats such as Beta or VHS. The standard format for ½" tape used for digital audio is called F-1. In this connection, the invention may also be practiced using any one of Beta, SVHS, VHS or F-1 formatted video tape.

The video tape 11 is loaded into a video tape player 13. The video signals containing the digital audio, graphics or data are provided to and treated by a cable television distribution system 15 like all the other channels of video (with audio) that are part of the cable television services.

There are several cable television distribution systems with many content companies supplying the video material that is distributed to the cable subscribers. The cable television distribution system 15 is meant here to include, for example, headend operations, fiber optical cable (where available) ending in coaxial cable 17 in the subscribers home. Other distribution systems including, for example, satellite to dish and dish to satellite should function equally as well.

The coaxial cable 17 carries a signal which contains all of the television channel services for the subscriber. In the case of the present invention, one or more of the television signals contains the digital audio (with data and/or graphics, if present) information as encoded on the original video tape.

The cable distribution may introduce noise, but, in cases where the noise is low and data content is not critical, the digital data can be decoded in the home. If a broadcast television signal arrives in the home with sufficiently low enough noise, it would be possible to supply digital audio and graphics even by broadcast television. However, in a preferred embodiment, error detection/correction and synchronization is added to the signal as described below.

Figure 2:
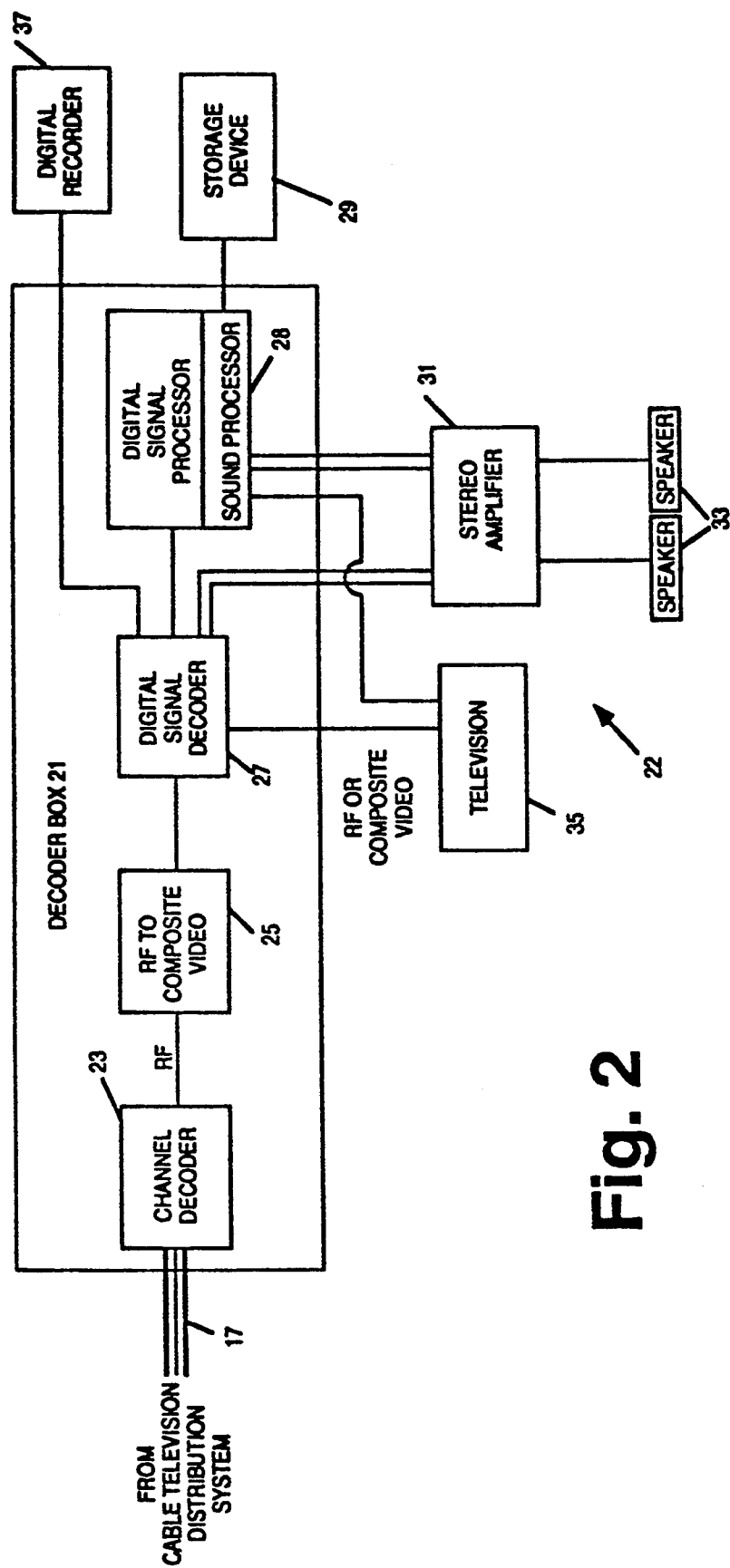
FIG. 2 is a block diagram showing the elements of a decoder box according to the invention and connections to components of a home audio-video system.

The cable 17 that comes into the home has the signal for all of the television services including digital audio, data and/or graphics. With or without the present invention, the cable is input to a decoder box 21 in the home whose output is used by a television/stereo system 22. FIG. 2 shows a modified decoder box 21 in this role which has the ability to decode the digital audio in addition to its usual role of decoding the television channels that the subscriber has ordered.

In FIG. 2, the modified decoder box 21 includes a channel decoder 23 of a type in common usage in homes wired for cable television. It accepts the coaxial cable 17 and decodes any single television channel which the subscriber has selected. The box generates an "RF" signal which almost all televisions in use today can accept and convert to a display.

In the case of television channels with digital audio, graphics or data some additional processing is needed. Although the additional processing is shown as being performed by separate boxes 25 and 27 in FIG. 2, all of the necessary processing can be integrated into a single physical box.

The process of converting the "RF" with a digitally encoded signal to composite video may not be needed in an integrated box because the composite video signal may be available during channel decoding. However, when using an existing cable decoding box, in one preferred embodiment, the RF to composite video function 25 is used so that the composite video signal required as an input to a digital signal decoder 27 is available. The RF to composite video function 25 may be implemented using a video cassette recorder such as a Sony SLV-585HF.

The digital audio format used on the original video tape 11 determines what kind of digital signal decoder 27 is needed in the system. The least expensive setup would use the F-1 format and an F-1 decoder such as a Sony 601ESD decoder as the digital signal decoder 27. This decoder takes in composite video with F-1 encoding and puts out stereo audio ready for a professional or home stereo amplifier 31 and speakers 33. The output from RF to composite video box 25 is simply passed to a normal home television 35. A suitable decoder 27 for PCM 1630 formatted tapes would also be the PCM 1630 decoder.

In addition to delivery of digital audio, since there is much unused space in the video channel, there is sufficient bandwidth to contain digital graphics information to display song lyrics or album information. The places the digital graphics information could go include parts of the video picture signal that do not contain the digital audio information (a lot of room is available here, especially in the F-1 format), or in the video vertical blank area. Digital graphics information could even be encoded as FSK audio signals in the signal space that is normally used for the audio accompanying the video.

If digital graphics information is to be provided, the format of the digital graphics in one embodiment is the same format as used by Compact Disc+Graphics (known as the "red book" standard) or digital compact cassette (DCC). Chips or discrete circuits, the details of which should be readily apparent to persons skilled in the art may be used for processing these formats into graphics in video RAM which will deliver a synchronized graphics program to the same television set 35 that is hooked up to the decoder box 21 to receive the other television channels' pictures.

The digital output to a digital recorder 37 represents a way to deliver "records" into the home. There are several recording media for quality digital recording which may be utilized, including digital audio tape (DAT)—for very high quality recording—and digital compact cassette (DCC) or mini-disc (Sony Mini Disc-)—for lower, but good quality recording.

If the home decoder unit 21 is equipped with a standard digital output (e.g., SDIF), then the unit can be connected to a recording unit 37. The resulting recording would be better than most pre-recorded cassette tapes currently available. If the recording unit is a DAT unit, the recording quality would be as good as a Compact Disc. For this reason, in a preferred embodiment, the digital output would only be switched "ON" when the subscriber had paid a special fee to cover the copyrights on the program to be recorded.

This above-described system is one way to deliver digital audio with graphics to cable subscribers. The above described system could be easily adapted to deliver digital data as well as audio and graphics. The process of delivery would be the same as described above, except the encoding and decoding of the information to and from audio and video would not be needed. Additionally, inasmuch as digital data in most cases cannot tolerate loss of data, suitable error correction/detection and synchronization is needed.

Figure 3:
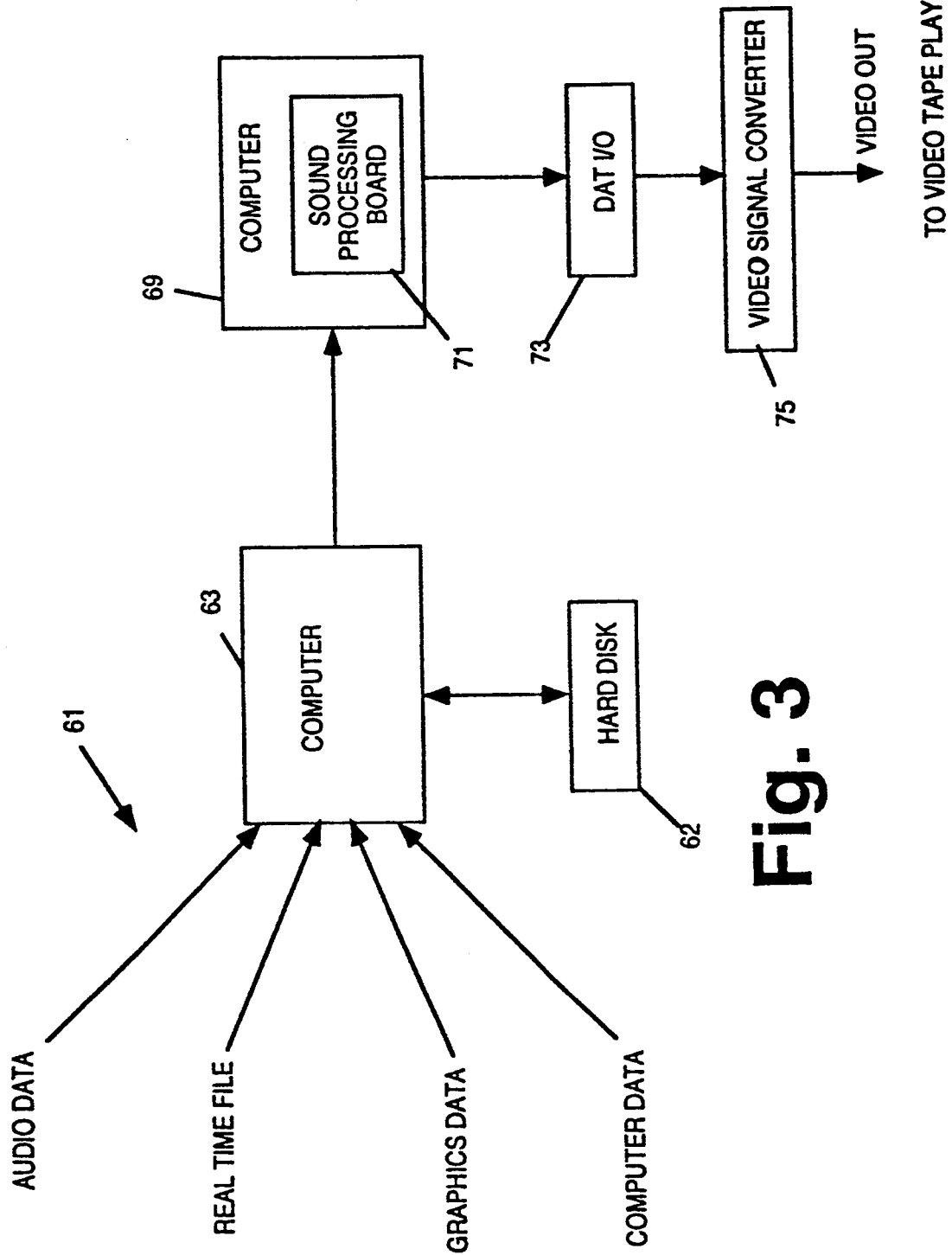
FIG. 3 is a block diagram showing an embodiment of the invention for converting digital audio, graphics, text or other digital data for broadcast or transmission over cable.

In this connection, FIG. 3 is a block overview diagram showing the components needed to provide error detection/correction and synchronization to the digital data being transmitted. It should be understood however that the specific detection/correction and synchronization scheme set forth is provided by way of example only. FIG. 3 also includes a mechanism for encoding and decoding audio data in a format known as AIFF or Audio Interchange File Format.

Figure 4:
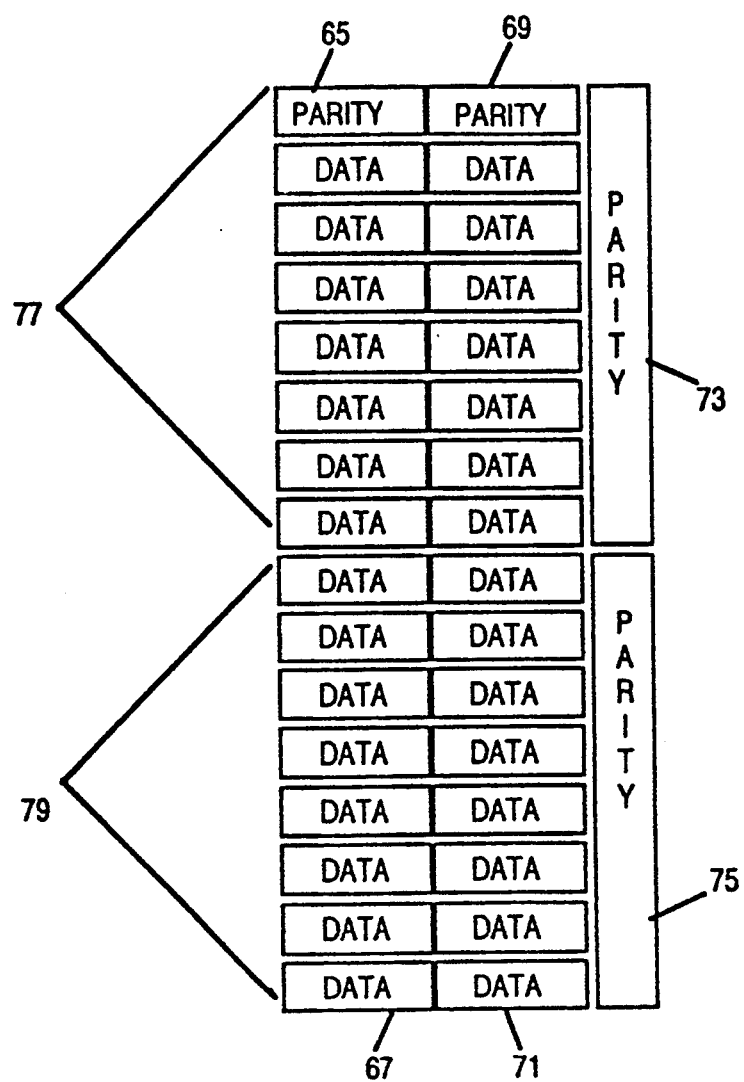
FIG. 4 is a diagram showing a technique for adding parity information for error detection and correction.

First, digital information in the form of graphics, text, real time files, binary or other digital data source 61 is created by any appropriate mechanism such as a scanner, analog/digital converter or generation by operation of a computer program such as a word processor, paint program or real time file builder such as described in co-pending U.S. patent application Ser. No. 07/906,712 filed Jul. 1, 1992 assigned to the same assignee as the present invention. A real time file is a file containing multiple simultaneous video, audio or graphics sequences, or any combination thereof, wherein each sequence can be dynamically selected for playback by the user. The digital information is stored on magnetic media such as a hard disk 62 of a personal computer system 63. The stored data is then read and parity bits are added to provide a mechanism for error detection and correction. For example, a relatively simple scheme would divide the data into groups of thirty bytes of data, each byte being eight bits. The thirty bytes of data are arranged into two columns of 15 bytes each as shown in FIG. 4. Four parity bytes are then created as follows. Parity byte 65 is formed by ANDing the bits in column 67 from most significant bit to least significant bit (or visa versa). The result of the AND operation for each column of bits is stored in the corresponding bit position of parity byte 65. In a similar manner, parity byte 69 is determined by ANDing the bit positions of the bytes in column 71. Two more parity bytes 73 and 75 are then calculated by ANDing corresponding bit positions in rows 77 and 79. A Visual Basic program for calculating the parity bytes for error detection/correction is attached hereto as Appendix 1. Also included is C source code for a DLL called by the program and the globals used in the program.

After the parity bytes have been calculated and appended to the data file, synchronization fields are added to the beginning and ending of the data file. An example of one suitable synchronization scheme would be to add to the beginning and ending of a parity encoded data file synchronization fields 16 bytes in length containing a repeating recognizable pattern not likely to occur in the data. One suitable pattern would be a byte containing hexadecimal DB or $11011011_2$ repeated 16 times.

The digital data file with parity information and synchronization fields included, can then be converted to a digital audio format known as AIFF or Audio Interchange File Format, the specifications for which can be found in a publication published by Apple Computer, Inc. entitled "Audio Interchange File Format:AIFF Version 1.2. The data stored on hard disk 62 is transferred to an Apple Macintosh II computer 69 with a DigiDesign Sound Designer board 71 and Sound Design II software, both available from DigiDesign, Inc. The file is then transmitted through the output port of the DigiDesign board to a DigiDesign DAT I/O box 73 (also available from DigiDesign, Inc.). Box 73 converts the AIFF output from the DigiDesign Sound Designer board into and S/PDIF signal suitable for input to a Sony 601-ESD 75. The Sony 601-ESD then converts the signal to a signal suitable for broadcast or transmission over a cable network as described above. This converted signal could be recorded on an SVHS, VHS, Beta or F-1 formatted video tape for use in a video tape player 13 in FIG. 1.

At the receiving end the process would be reversed by a digital signal decoder 27 as shown in FIG. 2. The digital signal decoder 27 contains a device such as the Sony 601-ESD to convert the signal to a standard signal such as SDIF. This standard signal is then processed by a digital data processor 28 such as the DigiDesign SoundDesigner II Board in an Apple Macintosh computer resulting in a digital file suitable for magnetic storage or other computer processing such as AIFF. This file is further processed to remove the synchronization fields and perform error detection/correction as needed. To process the received data, it is necessary to remove the synchronization fields, and determine if there are any errors in the received data, and correct any detected errors during the digital signal processing performed by signal processor 28 (see FIG. 2).

The result of this process could be immediately displayed/listened to on the television/stereo or other device connected to the decoder box 21, or saved on a storage device 29 for later use. An inexpensive method of storage would be the Sony optical read/write minidisk. This disk could be used to display and/or listen to the digital data received on the television/stereo or removed and displayed and/or listened to in a variety of portable handheld players such as those available from Sony Corporation. One application of this would be digitally transmitted magazines and newspapers. The home subscriber could receive publications of this type and view it using the handheld player or the television, 'paging' through the data much the same as the printed medium.

---

APPENDIX 1

Visual Basic Source Code forError Detection/Correction:

```
Dim FileType As String
Dim FileName As String
Dim InFileName As String
Dim OutFileName As String
Dim InFile As Integer
Dim OutFile As Integer
Dim FileOpenErr As Integer
Declare Function wPar Lib "ecc.dll" (ByVal n%) As Integer
Declare Function StripEcc Lib "ecc.dll" (n As Any) As Integer
Declare Function AddEcc Lib "ecc.dll" (n As Any) As Integer
Sub ExitCtl_Click ( )
    End
End Sub
Sub FileOpenDialog ( )
    On Error Resume Next
    CMDialog1.Flags = OFN_HIDEREADONLY
    CMDialog1.DefaultExt = "TXT"
    CMDialog1.DialogTitle = "Open" + FileType + "File"
    CMDialog1.filter = "Text File (*.TXT)|*.txt|All Files (*.*)|*.*|"
    'set default filter - All Files
    CMDialog1.FilterIndex = 2
    'set dialog options:
    CMDialog1.CancelError = -1
    'display File Open dialog
    CMDialog1.action = 1
    'user selected OK
    If Err = 0 Then
        FileName = CMDialog1.FileName
    ElseIf Err = 32755 Then
        FileName = ""
    End If
End Sub
Sub OpenFiles ( )
On Error GoTo OpenError
FileOpenErr = 0
If InFileName = "" Then
    MsgBox "No Input File Specified.", 0, "EDC"
    FileOpenErr = 1
    Exit Sub
End If
If OutFileName = "" Then
    MsgBox "No Output File Specified.", 0, "EDC"
    FileOpenErr = 1
    Exit Sub
End If
InFile = FreeFile
Open InFileName For Binary As InFile
If FileOpenErr < > 0 Then
    Exit Sub
End If
OutFile = FreeFile
Open OutFileName For Binary As OutFile
Close OutFile
Kill OutFileName
OutFile = FreeFile
Open OutFileName For Binary As OutFile
```

APPENDIX 1 -continued

```
On Error GoTo 0     'Turn Error trap off
Exit Sub
OpenError:
If Err >51 And Err <77 Then
    MsgBox Error$, 0, "EDC"
    FileOpenErr = Err
    Resume Next
Else
    Error Err
End If
End Sub
'Get Horizontal Parity computes the parity of the
'passed integer
,
Function GetHpar (ByVal n As Integer) As Integer
parity% = 0
For i = 0 To 15
    If n And 2   i Then
        parity% = parity% Xor 1
    End If
Next i
GetHpar = parity%
End Function
Sub OpenInputCtl_Click ( )
    FileType = "Input"
    FileOpenDialog
    InFileName = FileName
End Sub
Sub OpenOutputCtl_Click ( )
    FileType = "Output"
    FileOpenDialog
    OutFileName = FileName
End Sub
Sub AddCodeCtl_Click ( )
    Static x As String * 600    '20 30 byte blocks
    Static y As String * 680    '20 34 byte blocks
    Static Buf As String * 34
    Dim i As Integer, j As Integer, k As Integer
    Dim n As Integer
    OpenFiles
    If FileOpenErr <> 0 Then
        Exit Sub
End If
Screen.MousePointer = 11'    set to hourglass
FileSize& = LOF(InFile)
Put OutFile,, FileSize&
Do
,
'Read in 20 blocks
,
Get InFile,, x$
k = 1
j = 1
For i = 1 To 20
    Buf$ = Mid$(x$, j, 30)
    n = AddEcc(ByVal Buf$)
    Mid$(y$, k, 34) = Buf$
    j = j + 30
    k = k + 34
Next i
,
'Write out corrected blocks
,
Put OutFile,, y$
Loop Until EOF(InFile)
Close InFile
Close OutFile
Screen.MousePointer = 0'    set to normal
End Sub
Sub StripCodeCtl_Click ( )
Static x As String * 600    '20 30 byte blocks
Static y As String * 680    '20 34 byte blocks
Static Buf As String * 34
Dim nerr As Integer, i As Integer, j As Integer
Dim k As Integer, n As Integer, uncerr As Integer
OpenFiles
If FileOpenErr <> 0 Then
    Exit Sub
End If
Get InFile,, FileSize&
DataBytesWritten& = 0
```

APPENDIX 1

```
Screen.MousePointer = 11'    set to hourglass
Do
'
'Read in 20 blocks
'
Get InFile,, y$
j = 1
k = 1
For i = 1 To 20
    Buf$ = Mid$(y$, j, 34)
    n = StripEcc(ByVal Buf$)
    If n <0 Then
        uncerr = uncerr - n
    End If
    If n >0 Then
        nerr = nerr + n
    End If
    Mid$(x$, k, 30) = Buf$
    j = j + 34
    k = k + 30
Next i
'
'Write out corrected blocks
'
If (FileSize& - DataBytesWritten&) >600& Then
    Put OutFile,, x$
    DataBytesWritten& = DataBytesWritten& + 600
Else
    For n = 1 To (FileSize& - DataBytesWritten&)
        a$ = Mid$(x$, n, 1)
        Put OutFile,, a$
    Next n
    GoTo AllDone
End If
Loop Until EOF(InFile)
AllDone:
    Close InFile
    Close OutFile
    Screen.MousePointer= 0'    set to normal
    If nerr >0 Then
        MsgBox Str$(nerr) + "errors corrected.", 0, "EDC"
End If
If uncerr >0 Then
    MsgBox Str$(uncerr) + "uncorrectible errors.", 0, "EDC"
End If
End Sub
'
'GetPar Hpr, Vpr, Cpr, n( )
'
'Calculates the horizontal, vertical and combined
'parity of the 15 byte array
'
Sub GetPar (Hpr As Integer, Vpr As Integer, Cpr As Integer, n( ) As Integer)
    Dim i As Integer, j As Integer, k As Integer
    Hpr = 0
    Vpr = 0
For i = 1 To 15
    Vpr = Vpr Xor n(i)
    Hpr = Hpr Or (GetHpar(n(i)) * 2   (i - 1))
Next i
i = GetHpar(Vpr)
k = wPar(Vpr)
j = GetHpar(Hpr)
Cpr = i Xor j
End Sub
```

C Language Source Code for DLL-called in Visual Basic module via AddEcc and StripEcc:

```
//
// ecc.c -- This file contains the source for a dll used by the Visual Basic
//       program, edc. It contains:
//
//       (1) wPar -- computes the parity of an integer;
//       (2) AddEcc -- adds the rectangular parity correction code.
//       (3) StripEcc -- applys the rectangular parity correction code.
//
#define WINVER 0x0300
#include <windows.h>
int chpar, cvpar, ccorpar; // calculated parity values
///// Every DLL has an entry point LibMain and an exit point WEP.
// Turnoff warning:
// "Parameter <name> is never used in function <function_name>"
```

-continued

APENDIX 1

```
#pragma argsused
int FAR PASCAL LibMain(   HANDLE hinstance, WORD wDataSegment,
                          WORD wHeapSize, LPSTR IpszCmdLine)
{
    // The startup code for the DLL initializes the local heap
    // (if there is one)
    // with a call to LocalInit which locks the data segment.
    if (wHeapSize != 0)
        UnlockData(0);
                return 1; // Indicate that the DLL was initialized successfully.
}
// Turn off warning:
// "Parameter <name> is never used in function <function_name>"
e#pragma argsused
int FAR PASCAL WEP (int bSystemExit)
{
        return 1;
}
//
// wPar returns the parity of the passed integer
//
int FAR PASCAL_export wPar (int n)
{
    asm {
    push si
    push di
    xor di,di
    xor si,si
    mov dx,n
        mov cx,16
        }
calc:
        asm {
        shl dx,1
        jnc calc2
        xor si,1
        }
calc2:
        asm {
        loop calc
        mov ax,si
        pop di
        pop si
        }
        return (_AX);
}
//
// wBitOn returns the count of bits on in the passed integer
//
int wBitOn (int n)
{
    asm {
    push si
    push di
    xor di,di
    xor si,si
    mov dx,n
        mov cx,16
        }
calc:
        asm {
        shl dx,1
        jnc calc2
        inc si
        }
calc2:
        asm {
        loop calc
        mov ax,si
        pop di
        pop si
        }
        return (_AX);
}
// Function:   CalcPar
// Input:      bufptr = pointer to 34 byte buffer
// Returns:    sets globals chpar, cvpar and ccorpar
//
void CalcPar(int *buf)
{
int i, j, k;
```

-continued
APPENDIX 1

```
chpar = cvpar = ccorpar = 0;
for (i = 0; i <15; i++)
{
        cvpar    ^= buf[i];
    chpar |= wPar(buf[i]) <<i;
}
j = wPar(cvpar);
k = wPar(chpar);
ccorpar = j ^ k;
}
// Function:   AddEcc
// Input:      bufptr = pointer to 34 byte buffer
// Returns:    ECC set in last two words of buffer
//
// Method:     Computes horizontal and vertical parity and corner bit parity
//             from the first 15 words in the buffer and compares the results
//             to the stored paritys.
//
int FAR PASCAL_export AddEcc(int *buf)
{
CalcPar(buf);
if (ccorpar)
        chpar |= 0x8000;
buf[15] = cvpar;
buf[16] = chpar;
}
// Function:   StripEcc
// Input:      bufptr = pointer to 34 byte buffer
// Returns:    error count = zero if no error
//                           positive if correctible errors
//                           negative if uncorrectible error
//
// Method:     Computes horizontal and vertical parity and corner bit parity
//             from the first 15 words in the buffer and compares the results
//             to the stored paritys.
//
//             Cases:
//             (1) No error: Computed values equal stored values
//             (2) Error in stored parity: Disagrees with corner bit =
//                 uncorrectible error
//             (3) No error in stored parity: Agrees with corner bit
//                 (a) Horizontal and vertical calculated paritys differ from
//                     the stored values in exactly one position =
//                     correctible error
//                 (b) Horizontal and vertical calculated paritys differ from
//                     the stored values in more than one position =
//                     uncorrectible errors
//
int FAR PASCAL_export StripEcc(int *buf)
{
int hpar, vpar, corpar; // stored values
int herr, verr;         // mask of errors
int i, j, k;
//
//Calculate paritys
//
CalcPar(buf);
//
//Get stored paritys
//
vpar = buf[15];
hpar = buf[16];
corpar = 0;
if (hpar & 0x8000)
    corpar = 1;
hpar &= 0x7fff;
//
//Do analysis
//
j = wPar(vpar);
k = wPar(hpar);
if ((j ^ k) |= corpar)
    return (−1);        // error in stored paritys
j = chpar ^ hpar;
k = cvpar ^ vpar;
if (j == 0 && k == 0)
    return (0);
herr = wBitOn(j);
verr = wBitOn(k);
if ((herr != 1) && (verr != 1))
        return( - (max(herr,verr)));
```

-continued

APPENDIX 1

```
//
//A single correctible error -- correct it
//
i = 0;
while (j != 0)
{
        j >>= 1;
        i++;
}
buf[i-1] = k;
return(1);
}
```

Globals used by Visual Basic Module:

Global Const OFN_HIDEREADONLY = &H4&

We claim:

1. A system for delivering digital data encoded in a video signal comprising:
  a) recording means for recording digital data as a digitally encoded video signal;
  b) distribution means for coupling to said recording means for distributing the recorded digitally encoded video signal to end users as one of a plurality of channels;
  c) video signal decoding means for coupling to said distribution means for decoding the distributed recorded, digitally encoded video signal to produce an output signal representing a single user selected channel, said single user seletected channel being the one channel of said plurality of channels;
  d) output signal decoding means coupled to said video signal decoding means for decoding the output signal to convert the decoded, distributed and recorded, digitally encoded video signal to the digital data.

2. The system defined by claim 1 wherein the digital data is audio information.

3. The system defined by claim 1 wherein the digital data is video information.

4. The system defined by claim 1 wherein the recording means is a video tape recorder capable of recording the video signal in a predetermined standardized format.

5. The system defined by claim 1 wherein the distributing means is at least one of:
  i) a dish-to-satellite, and a satellite-to-dish; and
  ii) a fiber optical cable ending in a coaxial cable in a cable subscriber's home.

6. The system defined by claim 1 wherein the video signal decoding means is a circuit which decodes a predetermined one of a plurality of signals representing information for one of a plurality of channels into a radio frequency signal adapted for use by a television receiver.

7. The system defined by claim 6 wherein the output signal decoding means is a circuit which decodes the radio frequency signal containing the digitally encoded video signal to produce a digitized signal representing the digital data encoded in the video signal.

8. The system defined by claim 7 wherein the digitized signal representing the digital data encoded in the video signal contains audio information.

9. The system defined by claim 7 wherein the digitized signal representing the digital data encoded in the video signal contains video information.

10. The system defined by claim 7 wherein the digitized signal representing the digital data encoded in the video signal contains digital graphics information.

11. The system defined by claim 7 wherein the digitized signal representing the digital data encoded in the video signal contains a real time file with multiple simultaneous sequences, wherein each said sequence includes at least one of graphics information, audio information and video information.

12. The system defined by claim 7 wherein the digitized signal representing the digital data encoded in the video signal contains digital data which is at least one of numerical data and text data.

13. The system defined by claim 7 wherein the digitized signal representing the digital data encoded in the video signal contains a real time file with multiple simultaneous graphics sequences.

* * * * *